United States Patent
Berthereau et al.

(10) Patent No.: US 8,173,560 B2
(45) Date of Patent: May 8, 2012

(54) GLASS YARNS CAPABLE OF REINFORCING ORGANIC AND/OR INORGANIC MATERIALS

(75) Inventors: Anne Berthereau, Challes les Eaux (FR); Emmanuel Lecomte, Aulnay-sous-Bois (FR)

(73) Assignee: Saint-Gobain Technical Fabrics Europe, Chambery (FR)

( * ) Notice: Subject to any disclaimer, the term of this patent is extended or adjusted under 35 U.S.C. 154(b) by 319 days.

(21) Appl. No.: 12/519,584

(22) PCT Filed: Dec. 19, 2007

(86) PCT No.: PCT/FR2007/052565
§ 371 (c)(1),
(2), (4) Date: Jun. 22, 2009

(87) PCT Pub. No.: WO2008/087327
PCT Pub. Date: Jul. 24, 2008

(65) Prior Publication Data
US 2010/0093511 A1    Apr. 15, 2010

(30) Foreign Application Priority Data
Dec. 22, 2006  (FR) ...................................... 06 55867

(51) Int. Cl.
C03C 13/06 (2006.01)
C03C 13/00 (2006.01)
C03C 13/08 (2006.01)
C03C 3/087 (2006.01)

(52) U.S. Cl. ................. 501/36; 501/35; 501/38; 501/70

(58) Field of Classification Search .................... 501/35, 501/36, 70, 38
See application file for complete search history.

(56) References Cited

U.S. PATENT DOCUMENTS

| | | | |
|---|---|---|---|
| 3,847,627 A * | 11/1974 | Erickson et al. | 501/38 |
| 3,876,481 A * | 4/1975 | Erickson et al. | 501/38 |
| 4,023,715 A * | 5/1977 | Biondo | 222/307 |
| 4,199,364 A | 4/1980 | Neely | |
| 6,686,304 B1 * | 2/2004 | Wallenberger | 501/35 |
| 6,818,575 B2 * | 11/2004 | Wallenberger | 501/35 |
| 6,933,045 B2 * | 8/2005 | Tamura | 428/364 |
| 7,799,713 B2 * | 9/2010 | Hofmann et al. | 501/36 |
| 2007/0112123 A1 * | 5/2007 | Sekine | 524/494 |
| 2007/0203401 A1 * | 8/2007 | Gordon et al. | 600/300 |
| 2008/0191179 A1 * | 8/2008 | Bernard et al. | 252/601 |
| 2009/0042030 A1 * | 2/2009 | Douce et al. | 428/392 |
| 2010/0184345 A1 * | 7/2010 | Lalande et al. | 442/1 |
| 2010/0248928 A1 * | 9/2010 | Berthereau et al. | 501/32 |

FOREIGN PATENT DOCUMENTS

| | | |
|---|---|---|
| EP | 1 900 699 | 3/2008 |
| GB | 1 391 384 | 4/1975 |
| JP | 2001 213639 | 8/2001 |
| WO | WO 2005092808 A1 * | 10/2005 |
| WO | WO 2005092828 A1 * | 10/2005 |
| WO | WO 2006103375 A2 * | 10/2006 |
| WO | WO 2006103377 A2 * | 10/2006 |

OTHER PUBLICATIONS

U.S. Appl. No. 12/663,087, filed Dec. 4, 2009, Berthereau, et al.
U.S. Appl. No. 12/989,225, filed Oct. 22, 2010, Lecomte.

* cited by examiner

Primary Examiner — Karl Group
Assistant Examiner — Elizabeth A Bolden
(74) Attorney, Agent, or Firm — Oblon, Spivak, McClelland, Maier & Neustadt, L.L.P.

(57) ABSTRACT

The invention relates to a glass strand, the chemical composition of which is substantially free of boron oxide and comprises the following constituents, in the limits defined below expressed as percentages by weight:

| | |
|---|---|
| $SiO_2$ | 55 to 65 |
| $Al_2O_3$ | 9 to 16 |
| CaO | 15 to 26 |
| MgO | 1 to 5 |
| BaO + SrO | 0.5 to 5 |
| $Na_2O + K_2O + Li_2O$ | 0 to 2 |
| $TiO_2$ | 0 to 1 |
| ZnO | 0 to 2 |
| $ZrO_2$ | 0 to 2. |

It also relates to composites comprising such strands.

16 Claims, No Drawings

GLASS YARNS CAPABLE OF REINFORCING ORGANIC AND/OR INORGANIC MATERIALS

CROSS-REFERENCE TO RELATED APPLICATIONS

This application is a 371 of PCT/FR07/052565 filed Dec. 19, 2007 and claims the benefit of FR 0655867 filed Dec. 22, 2006.

The present invention relates to glass strands or fibers, especially those intended for reinforcing organic and/or inorganic materials and able to be used as textile strands, these strands being able to be produced by a process consisting in mechanically attenuating streams of molten glass emanating from orifices placed at the base of a bushing, generally heated by resistance heating.

The invention relates more particularly to glass strands having a particularly advantageous novel composition.

The field of glass reinforcement strands is one particular field of the glass industry. These strands are produced from specific glass compositions, the glass used having to be able to be attenuated into the form of filaments a few microns in diameter, using the process described above, and having to allow the formation of strands capable in particular of fulfilling their reinforcement role. The glass reinforcement strands most commonly used are thus strands formed from glasses whose composition derives from the eutectic composition of the $SiO_2$—$Al_2O_3$—CaO ternary diagram, the liquidus temperature of which is 1170° C. These strands are referred to by the name of "E-glass" strands, the archetype of which is described in the patent publications U.S. Pat. Nos. 2,334,981 and U.S. Pat. No. 2,571,074, which strands have a composition essentially based on silica, alumina, lime and boric anhydride. The latter compound, present with contents ranging in practice from 5 to 13% in glass compositions for E-glass, is added as a replacement for silica so as to reduce the liquidus temperature of the glass formed and to make it easier for the glass to melt. The term "liquidus temperature", denoted by $T_{liq}$, is the temperature at which, in a system in thermodynamic equilibrium, the most refractory crystal appears. The liquidus temperature therefore gives the limit below which it is possible to fiberize the glass. The forming margin is defined as the difference between the temperature at which the viscosity of the glass is 1000 poise (100 Pa·s), at which temperature the glass is generally fiberized, and the liquidus temperature.

E-glass strands are furthermore characterized by a limited content of alkali metal oxides (essentially $Na_2O$ and/or $K_2O$).

Application WO 96/39362 describes compositions containing neither boron nor fluorine, which are essentially formed from the $SiO_2$—$Al_2O_3$—CaO—MgO quaternary system containing small amounts of titanium oxide (less than 0.9%).

The mechanical properties of a composite reinforced by glass fibers are partly determined by the uniformity of distribution of the fibers within the polymer matrix to be reinforced. It therefore seems to be important to be able to have methods (if possible nondestructive methods) for checking this uniformity of distribution and to have glass compositions suitable for implementing said methods.

One object of the present invention is to propose glass compositions of advantageously low cost, having good formability and making it possible to obtain glass strands having high-temperature and acid resistance properties and mechanical strength that are significantly improved over those of E-glass and/or similar to those of the glasses described in application WO 96/39362, said compositions allowing nondestructive methods to be used for checking the uniformity of distribution of the fibers within the polymer matrix to be reinforced.

Another object of the invention is to propose glass compositions occasioning little fly-off, which would be prejudicial to the environment, when melting them.

For this purpose, the subject of the invention is a glass strand, the chemical composition of which is substantially free of boron oxide and comprises the following constituents, in the limits defined below expressed as percentages by weight:

| | |
|---|---|
| $SiO_2$ | 55 to 65 |
| $Al_2O_3$ | 9 to 16 |
| CaO | 15 to 26 |
| MgO | 1 to 5 |
| $Na_2O + K_2O + Li_2O$ | 0 to 2 |
| $TiO_2$ | 0 to 1 |
| BaO + SrO | 0.5 to 5 |
| ZnO | 0 to 2 |
| $ZrO_2$ | 0 to 2. |

Silica is an oxide acting as a glass network former, and plays an essential role in stabilizing the glass. Within the limits defined above, when the percentage of this constituent is less than 55%, the glass obtained is not viscous enough and it devitrifies too easily during fiberizing. For contents above 65%, the glass becomes very viscous and difficult to melt. Consequently, the silica content is preferably less than 63% and particularly preferably less than 62%. Since silica plays an essential beneficial role in acid corrosion resistance, its content is preferably greater than 58%, or even 59% and even 60% or 61%. A particularly preferred compromise consists in choosing a silica content between 60 (or 61) and 62%.

Alumina also constitutes a network former in the glasses according to the invention and plays a fundamental role in their stability. Within the limits defined according to the invention, a content of less than 9% causes a substantial increase in the hydrolytic attack of the glass, whereas increasing the content of this oxide to above 16% runs the risk of devitrification and an increase in the viscosity. Owing to its deleterious effect on the acid corrosion properties, the alumina content is preferably equal to or less than 15% or even 14% or 13% and even 12.5%, and/or equal to or greater than 10%, or even 11% or 12%. The greatest resistance to devitrification is obtained for alumina contents of between 11 and 14%, preferably between 12 and 13%.

The composition of glass strands according to the invention is substantially free of boron oxide $B_2O_3$. This means that it contains no boric anhydride, with the exception of possible impurities (generally less than 0.05%, even 0.01%) originating from the batch materials used.

Lime and magnesia make it possible to adjust the viscosity and control the devitrification of the glasses according to the invention. Within the limits defined according to the invention, a CaO content of 26% or higher results in an increase in the rates of devitrification to $CaSiO_3$ (wollastonite) prejudicial to good fiberizing. A CaO content of less than 15% results in too low a hydrolytic resistance. The CaO content is therefore preferably equal to or greater than 18%, even greater than 20% and/or equal to or less than 25%, or even 24% or 23%, and even 22% or 21.8% in order to improve the corrosion resistance in acid medium. The MgO content, together with the lime content, makes it possible to obtain glasses of which the liquidus temperature is particularly low. This is because the addition of magnesia in defined contents makes it possible to introduce a competition between the growth of wollastonite and diopside ($CaMgSi_2O_6$) crystals, this having the effect of reducing the rate of growth of these two crystals, and therefore of giving good devitrification resistance. The MgO content is equal to or greater than 1%, preferably equal to or greater than 2%, or even 2.5%. The MgO content is also preferably maintained at 4% or below, or even 3.5% or 3%. The ratio of the $SiO_2$ content to the CaO+MgO sum is preferably equal to or greater than 2.4, or even 2.42 or 2.45, so as to maximize the resistance of the strands to corrosion in acid medium.

Barium oxide (BaO) and strontium oxide (SrO) are essential, as their presence makes it possible to solve the technical problems at the basis of the present invention, and they also provide several additional advantages. This is because it has been observed that the presence of BaO and/or SrO makes it possible to implement methods of checking the uniformity of distribution of the fibers within the polymer matrix to be reinforced by X-ray transmission/absorption methods.

These oxides furthermore reduce the thermal expansion coefficient of the glass, this having the effect of reducing the overall thermal expansion coefficient of the composite material and therefore of increasing its dimensional stability. Advantageous properties in terms of ease of fiberizing are also attributable to these two oxides, in particular associated with an increase in the forming margin and a reduction in the rate of crystallization at the liquidus temperature. Taking these advantageous effects into account, but also their high cost, the sum of the contents of these elements, denoted as BaO+SrO, is preferably at least 0.8%, or even 1%, and/or at most 2%, or even 1.5%. The composition of the strands according to the invention may contain both these oxides at the same time, or, preferably, only one of them. When a single oxide is present, its content is preferably at least 0.5%, or even 0.8%, and/or at most 1.5%, or even 1.2%.

The alkali metal oxides may be introduced into the compositions of the glass strands according to the invention in order to limit devitrification and reduce the viscosity of the glass. However, the alkali metal oxide content must remain below 2% in order to avoid an unacceptable increase in the electrical conductivity for applications in the electronics field and to avoid a detrimental reduction in the hydrolytic resistance of the glass. The lithium oxide content must especially be maintained below 0.5% and preferably below 0.1% or even 0.05% or 0.01%. The inventors have demonstrated the extremely deleterious role of alkali metal oxides in the high-temperature resistance, characterized in particular by their softening temperature. This role is known in general, but within this particular context the effect on the reduction in characteristic temperatures at which the glass softens, due to very low alkali metal oxide contents has turned out to be astonishingly great. The total content of alkali metal oxides therefore preferably does not exceed 1.5%, or even 1%.

$TiO_2$ is known as a flow promoter for glass and is capable of reducing the liquidus temperature, and thereby partially replacing boron oxide. Above 1%, the yellow coloration and the additional cost that it generates may become unacceptable for certain applications. The ultraviolet absorption due to the high titanium contents may also be unacceptable when the fibers are intended for reinforcing polymers that are crosslinked by means of UV radiation. For these various reasons, the titanium oxide content of the glasses according to the invention is equal to or less than 1% and preferably equal to or less than 0.9% and even less than 0.8%. Owing to its favorable action on the resistance of the glass strands in acid medium, its content may advantageously be equal to or greater than 0.5%.

Zinc oxide (ZnO) is used to reduce the viscosity of the glasses according to the invention and to increase their acid corrosion resistance. However, owing to the high cost of this oxide, its content is preferably equal to or less than 0.4%, preferably equal to or less than 0.1%, or even less than 0.05% or 0.01%.

Zirconium oxide ($ZrO_2$) is capable of improving the acid resistance of the glass strands according to the invention. For this reason, a content of 0.5% or higher may be appreciated. However, owing to its unfavorable effect on devitrification of the glass, a content of 1% or less is preferred.

The manganese oxide content is less than 1% and preferably less than 0.3%. Since this oxide is liable to give the glass a very intensive violet coloration, the MnO content is preferably maintained below 0.1% or even 0.05% and even 0.01%.

Fluorine may be added in a small amount in order to improve the melting of the glass, or it may be present as an impurity. However, it has been discovered that small amounts of fluorine affect the temperature resistance of the glasses according to the invention very markedly. The fluorine content is therefore advantageously maintained below 0.5% and especially below 0.1%.

Iron oxide is an unavoidable impurity in the glasses according to the invention owing to its presence in several batch materials, and its content is generally less than 0.5%. Given that the coloration effect generally attributed to titanium is in fact due to electron transfer between $Fe^{2+}$ and $Ti^{4+}$ ions, the iron content in the glasses according to the invention is advantageously less than 0.3%, especially less than 0.2%, thanks to a judicious choice of batch materials.

One or more other components may also be present, generally as impurities, in the chemical composition of the strands according to the invention, the total content of these other components generally remaining equal to or less than 1%, preferably less than 0.5%, the content of each of these other components generally not exceeding 0.5%. In particular, these may be agents employed for refining the glass (eliminating the gaseous inclusions) such as sulfur, or compounds arising from the dissolution in the glass of small amounts of materials used as refractories in the glass melting furnace. These various impurities do not modify the way in which the glass strands described above solve the technical problem at the basis of the invention.

The glass strands according to the invention may be produced and employed like E-glass strands. They are also less expensive and exhibit better temperature resistance, acid corrosion resistance and tensile strength.

The glass strands according to the invention are obtained from glasses with the composition described above using the following process: a multiplicity of molten glass streams emanating from a multiplicity of orifices dispersed over the base of one or more bushings are attenuated into the form of one or more webs of continuous filaments, and then assembled into one or more strands that are collected on a moving support. This may be a rotating support when the strands are collected in the form of bound packages, or a support that moves translationally, when the strands are chopped by a member that also serves to attenuate them, or when the strands are sprayed by a member serving to attenuate them in order to form a mat.

The strands obtained, optionally after other conversion operations, may thus be in various forms, namely continuous strands, chopped strands, braids, tapes, mats, networks, etc., these strands being composed of filaments with a diameter possibly ranging from 5 to 30 microns, approximately.

The molten glass feeding the bushings is obtained from batch materials that may be pure (for example coming from the chemical industry) but are often natural, these batch materials sometimes containing impurities in trace amount and being mixed in appropriate proportions in order to obtain the desired composition, and then melted. The temperature of the molten glass (and therefore its viscosity) is conventionally set by the operator so as to allow the glass to be fiberized, while in particular avoiding problems of devitrification, and so as to obtain the best possible quality of the glass strands. Before they are assembled in the form of strands, the filaments are generally coated with a sizing composition for protecting them from abrasion and facilitating their subsequent association with materials to be reinforced.

The composites obtained from the strands according to the invention comprise at least one organic material and/or at least one inorganic material and glass strands, at least some of the strands being glass strands according to the invention.

Optionally, the glass strands according to the invention may have already been associated, for example during attenuation, with filaments of organic material so as to obtain composite strands. By extension, the expression "glass strands whose composition comprises . . . " is understood to mean, according to the invention, "strands formed from filaments of glass whose composition comprises . . . ", the glass filaments being optionally combined with organic filaments before the filaments are assembled as strands.

Owing to their good high-temperature resistance properties, the glass strands according to the invention may also be used for furnishing motor vehicle exhaust systems. In this particular application, the glass strands according to the invention give good acoustic insulation properties, but they are also exposed to temperatures that may exceed 850° C. or even 900° C.

The advantages afforded by the glass strands according to the invention will be more fully appreciated through the following examples, which illustrate the present invention without however limiting it.

Table 1 gives four examples according to the invention, numbered 1 to 4, and two comparative examples, numbered C1 and C2. C1 is a standard E-glass composition and C2 is according to the teaching of Application WO 96/39362.

The composition of the glasses is expressed as percentages of oxides by weight.

To illustrate the advantages of the glass compositions according to the invention, Table 1 presents five fundamental properties:

the temperatures corresponding respectively to the viscosities of $10^{2.5}$ poise and $10^3$ poise, denoted by $T_{log2.5}$ and $T_{log3}$ measured according to the ISO 7884-2 standard and expressed in degrees Celsius, close to the temperature of the glass in the bushing;

the difference between the temperature $T_{log3}$ and the liquidus temperature (expressed as $T_{liq}$), which represents a forming margin that has to be as high as possible;

the softening temperature or Littleton softening temperature, corresponding to a viscosity of $10^{7.6}$ poise, denoted by $T_{log7.6}$ and expressed in degrees Celsius, this value being indicative of the temperature resistance of the fibers, the value of the failure stress in three-point bending of composites based on vinyl ester resin (sold by Dow Chemical Company under the name Derakane 411-350) comprising a fiber volume fraction of 50% after immersion in a hydrochloric acid solution (HCl of 1N concentration) at room temperature for 100 hours. This stress is expressed in MPa and characterizes the corrosion resistance of the fibers in acid medium; and the thermal expansion coefficient of the glass, measured according to the NF B30-103 standard and expressed in $10^{-7}/°$ C.

TABLE 1

|  | C1 | C2 | 1 | 2 | 3 | 4 |
|---|---|---|---|---|---|---|
| $SiO_2$ | 54.4 | 60.1 | 60.4 | 61.7 | 61.8 | 62.0 |
| $Al_2O_3$ | 14.5 | 12.8 | 12.3 | 12.2 | 11.4 | 11.5 |
| $B_2O_3$ | 7.3 | — | — | — | — | — |
| CaO | 22.1 | 23.1 | 21.7 | 20.8 | 21.4 | 21.4 |
| MgO | 0.25 | 3.3 | 3.0 | 3.0 | 2.9 | 2.9 |
| BaO | — | — | — | 1.1 | — | 1 |
| SrO | — | — | 1.4 | — | 1.1 | — |
| $Na_2O$ | 0.5 | 0.3 | 0.6 | 0.6 | 0.6 | 0.6 |
| $K_2O$ | 0.35 | 0.2 | 0.4 | 0.4 | | |
| $TiO_2$ | 0.1 | — | 0.1 | 0.1 | 0.1 | |
| $T_{log2.5}$ (° C.) | 1285 | 1350 | 1361 | 1368 | 1360 | 1359 |
| $T_{log3}$ (° C.) | 1205 | 1267 | 1275 | 1282 | 1271 | 1273 |
| $T_{log3}$-$T_{liq}$ (° C.) | 125 | 67 | 85 | 92 | 81 | 83 |
| $T_{log7.6}$ (° C.) | 836 | 920 | | | 917 | 916 |
| Failure stress (MPa) | 200 | 550 | 495 | 525 | | |
| Thermal expansion coefficient ($10^{-7}/°$ C.) | | 60 | 58.9 | 57.3 | | |

As indicated in Table 1, the strands according to the invention are very substantially superior to the E-glass fibers (Comparative Example C1) in terms of temperature resistance (the difference of about 100° C.) and of acid corrosion resistance (at least a two to three times higher failure stress).

The strands according to the invention have wear performance characteristics quite similar to those of Example C2, especially in terms of resistance to corrosion in acid medium and at high temperatures. On the other hand, they have a significantly lower thermal expansion coefficient, thus making it possible to improve the dimensional stability of the composites that contain them. It may also be pointed out that they have a 15 to 25° C. greater forming margin, which is reflected in greater fiberizability.

To test the possibility of using methods of checking the uniformity of distribution of the strands within the polymer matrix to be reinforced by X-ray absorption methods, the glass strands having the compositions C1, 3 and 4 were incorporated into a vinyl ester matrix in an amount of 30% strands by weight. The composites formed were irradiated using an X-ray tube, a film sensitive to this type of radiation being placed behind the composites. Table 2 below indicates, for each composite, the optical density of the photosensitive film. A darkened film, since it is exposed to the X-rays, has a higher optical density.

TABLE 2

|  | Optical density |
|---|---|
| Example C1 | 0.81 |
| Example 3 | 0.78 |
| Example 4 | 0.76 |

The lowest optical density of the photosensitive film shows that the opacity to X-rays of the glass strands according to the invention is higher, thereby making the visualization of the fibers within a composite easier and, by the same token, making it possible to carry out nondestructive testing of the uniformity of distribution of the strands within said composite.

The invention claimed is:

1. A glass strand, the chemical composition of which is substantially free of boron oxide and comprises:

| | |
|---|---|
| $SiO_2$ | 55 to 65 |
| $Al_2O_3$ | 9 to 16 |
| $CaO$ | 15 to 26 |
| $MgO$ | 1 to 5 |
| $BaO + SrO$ | 0.5 to 5 |
| $Na_2O + K_2O + Li_2O$ | 0 to 2 |
| $TiO_2$ | 0 to 1 |
| $ZnO$ | 0 to 2 |
| $ZrO_2$ | 0 to 2 | wherein the limits are expressed as percentages by weight.

2. The glass strand as claimed in claim 1, wherein the $SiO_2$ content is between 60 and 62%.

3. The glass strand as claimed in claim 1, wherein the $Al_2O_3$ content is between 10 and 12.5%.

4. The glass strand as claimed claim 1, wherein the CaO content is equal to or less than 21.8%.

5. The glass strand as claimed in claim 1, wherein the MgO content is equal to or greater than 2%.

6. The glass strand as claimed claim 1, wherein the ratio of the $SiO_2$ content to the CaO+MgO sum is equal to or greater than 2.4.

7. The glass strand as claimed in claim 1, wherein the BaO+SrO sum is between 0.5 and 1.5%.

8. A composite, comprising glass strands as defined in claim 1.

9. A process for manufacturing the glass strands as claimed in claim 1, comprising attenuating a multiplicity of molten glass streams emanating from a multiplicity of orifices disposed over the base of one or more bushings into the form of one or more webs of continuous filaments and of assembling said filaments into one or more strands that are collected on a moving support.

10. The glass strand as claimed in claim 1, comprising at least one of:

| | |
|---|---|
| $Na_2O + K_2O + Li_2O$ | 0.01 to 2, |
| $TiO_2$ | 0.5 to 1 |
| $ZnO$ | 0.01 to 2 |
| $ZrO_2$ | 0.5 to 2, | wherein the limits are expressed as percentages by weight.

11. The glass strand as claimed in claim 1, comprising ZnO 0.01 to 2 expressed as percentages by weight.

12. The glass strand as claimed in claim 1, comprising $ZrO_2$ 0.5 to 2 expressed as a percentage by weight.

13. The glass strand as claimed in claim 1, comprising $Na_2O+K_2O+Li_2O$ 0.01 to 2 expressed as a percentage by weight.

14. The glass strand as claimed in claim 1, comprising $TiO_2$ 0.5 to 1 expressed as a percentage by weight.

15. The glass strand as claimed in claim 1, comprising BaO+SrO 1.0 to 5 expressed as a percentage by weight.

16. The glass strand as claimed in claim 1, comprising BaO 1.1 to 1.5.

* * * * *